UNITED STATES PATENT OFFICE.

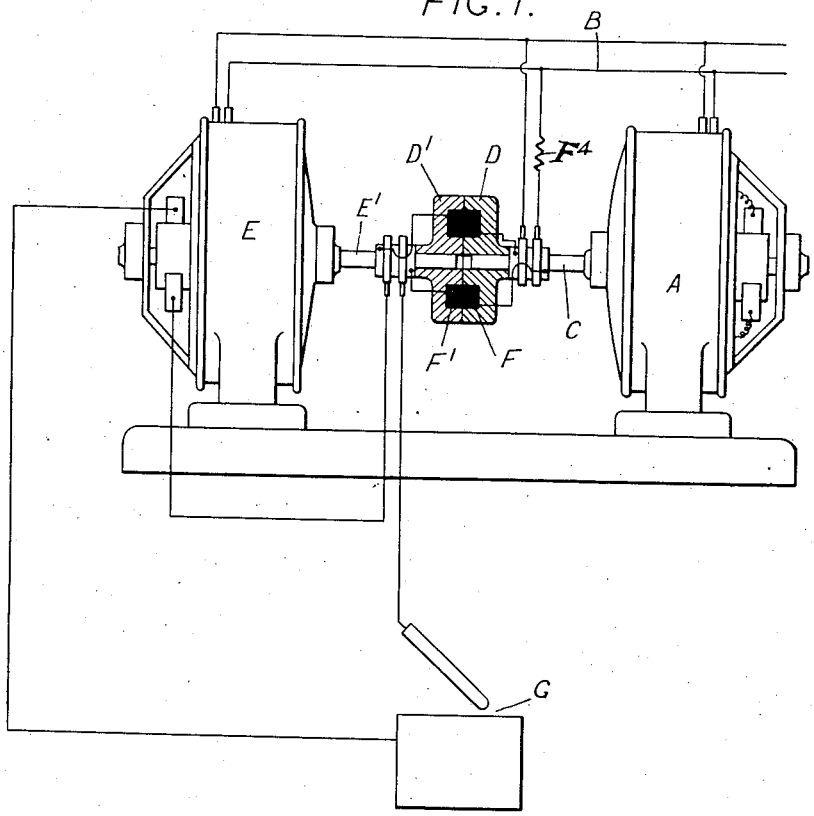

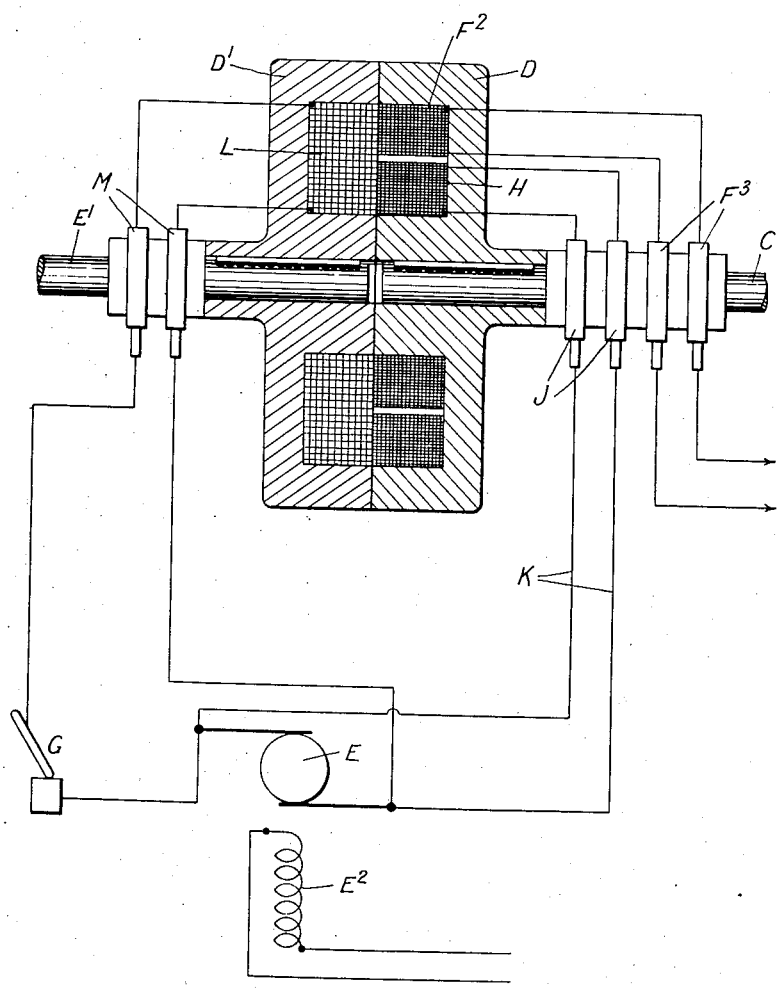

WALTER LANGDON-DAVIES, OF WEYBRIDGE, ENGLAND, ASSIGNOR OF TWO-THIRDS TO ALFRED SOAMES, OF LONDON, ENGLAND.

ELECTRICALLY-CONTROLLED CLUTCH.

1,303,484.  Specification of Letters Patent.  Patented May 13, 1919.

Application filed June 3, 1916. Serial No. 101,557.

*To all whom it may concern:*

Be it known that I, WALTER LANGDON-DAVIES, subject of the King of England, residing at Weybridge, Surrey in England, have invented certain new and useful Improvements in Electrically-Controlled Clutches, of which the following is a specification.

This invention relates to electrically controlled clutches and has particular reference to clutches which are used for driving dynamo electric machines.

The object of the present invention is the construction of a clutch whereby the power transmitted to a dynamo driven from a substantially constant speed shaft shall be automatically prevented from rising above a given maximum.

It has been proposed to regulate the output of dynamos intended say for lighting purposes and driven from shafts which vary considerably in speed, by interposing between the driving shaft and the dynamo an electrically controlled clutch. The object of such arrangements has differed from that of the present invention which is intended to apply to a dynamo electric machine driven from a constant speed shaft and liable to variation in its load.

According to this invention the clutch, which is preferably of the electromagnetic type and has no variable air-gap, is controlled by a coil energized by the current from the dynamo so that the power transmitted cannot exceed a predetermined amount.

The pressure tending to produce driving engagement between the clutch members is due to a coil energized by a current from some source of approximately constant voltage, and the effect of this coil is opposed by another coil energized by the current from the dynamo and tending to make the clutch members slip relatively to each other.

Preferably the construction of the clutch is such that the clutch members constitute the whole of the magnetic circuit without any air-gap and in any case there is no variable air-gap the pressure being altered by varying the magnetism passing between the friction surfaces.

A further feature of this invention is the provision of what may be termed a supplementary coil energized by a current varying with the voltage of the driven dynamo e. g. joined as a shunt across the brushes.

The winding or connections of this supplementary coil may be such that it acts against the first coil, when such is employed, i. e., so that it helps the opposing or current coil or, on the other hand, it may tend to assist the action of the first coil. This will depend upon the circumstances in which the clutch is employed and the nature of the regulation which it is desired to effect.

For instance, supposing the clutch to be used for driving a dynamo wholly or partially separately excited, the clutch being intended to slip if the current taken from the dynamo exceeds a predetermined amount. Owing to the facts that the coefficient of friction decreases as the speed increases for slow speeds and then increases with the speed and that metallic surfaces cannot be made perfectly smooth; also owing to residual magnetism and possibly to other causes, a magnetic friction clutch will, for a given pressure, transmit more power when it is not slipping than when it is slipping and for a given pressure, it will transmit more power when the slip is small i. e. when the relative speed between the friction surfaces is small, than when the slip is great.

The result of this, if the clutch has only what may be termed the first and second coils is that the current in the opposing coil i. e., the coil energized by the current from the driven dynamo, has to rise to a higher value than that at which the clutch will regulate when it is slipping in order to reduce the pressure on the clutch and start it slipping.

When it is desired to obviate this, the third or supplementary coil is provided, connected across the dynamo brushes and, in this instance, so connected that it tends to neutralize the first coil, that is to say, its action is to tend to make the clutch slip and in that sense to help the action of the opposing or current coil.

In the accompanying drawings,

Figure 1 is a diagram showing a dynamo driven through a clutch according to this invention and provided with two coils, and Fig. 2 shows, also diagrammatically, a similar clutch but provided with the third or supplementary coil.

In each figure the dynamo is shown, purely by way of example, as employed for electric welding.

With reference first to Fig. 1 a motor A taking current from mains B is shown by way of example as the source of power for the shaft C to which one clutch member D is coupled. It is, however, to be understood that the shaft C might be driven at an approximately constant speed by any means whatever.

The shaft E' of the dynamo E is coupled to the other clutch member D' and driving engagement is effected between the clutch members D and D' by the action of a coil F energized by an approximately constant current from the mains B.

The pressure between the two clutch members produced by the action of the coil F is more than sufficient to transmit the full power normally required from the dynamo and an opposing coil F' is provided which in the example illustrated is energized by the current in the main circuit of the dynamo, i. e. the current in the coil F' will correspond to the current taken at G for welding purposes. The ampere turns of the coils F and F' are so proportioned that when the dynamo is working with its full normal load the pressure between the clutch members D and D' is still just sufficient to drive the dynamo without slip occurring. But if more than the normal current is taken the effect of the coil F' so far opposes or neutralizes the effect of the coil F that slip occurs between the clutch members D and D' with the result that the speed of the dynamo falls and consequently its voltage drops. Thus any excess of current at the welding point G is avoided and damage to the work prevented.

It will be noticed that in Fig. 1 the dynamo E is represented diagrammatically as having its field-magnet coils connected to the mains B and it is advantageous that the dynamo should be wholly or partially separately excited either from constant voltage mains or in any other convenient way for by that means the magnetic field of the dynamo remains substantially constant and consequently the machine will run without any sparking troubles.

If it be desired to alter the point at which the clutch slips this may be done readily and without introducing any serious loss of efficiency by inserting an appropriate resistance $F^4$ in series with the coil F. The voltage of the dynamo may be regulated in the usual manner by means of a resistance in the exciting circuit.

It is to be noted that in the clutch shown and described there is no relative movement of any of the parts constituting the magnetic circuit in any direction which increases the length or reluctance of the magnetic circuit. The pressure between the clutch members varies according to the magnetic flux and by suitably choosing the part of the permeability curve and the range of speed at which the clutch works it is possible, over a considerable range, to make the speed of the dynamo vary with the load. Therefore, when the dynamo is separately excited, the volts vary with the speed and the current remains constant.

In Fig. 2 the shaft C driven as in Fig. 1 at an approximately constant speed from some source of power has keyed to it the clutch member D. The other clutch member D' is keyed to the shaft E' which drives the armature E of a dynamo, shown separately from the shaft in Fig. 2 and having its field-magnet coils $E^2$ separately excited from some source of constant E. M. F.

Within the clutch member D are two coils, one, $F^2$, connected to slip rings $F^3$, and energized by current from some source of constant E. M. F. and the other, H, connected to slip rings J, and joined in shunt by the conductors K across the terminals of the dynamo E.

Within the other clutch member D' is another coil L, the opposing coil, connected to slip rings M in the main circuit of the dynamo E which is represented, as in Fig. 1, purely by way of example, as employed for the purpose of electric welding at G.

The magnetism due to the first coil $F^2$ acts to produce driving pressure between the clutch members D and D'; the magnetism of the coil L tends to oppose this and produce slip and the effect of the third or supplementary coil H—in the example illustrated in Fig. 2—is also to oppose the action of the first coil $F^2$ i. e., to help the opposing coil L.

The effect of the three coils is as follows:—

On starting, the first coil $F^2$ is energized from the mains or other source of approximately constant voltage, the clutch members D, D' engage and run the dynamo up to speed. As the voltage of the dynamo rises the current in the third or supplementary coil H increases and tends to weaken the effect on the first coil $F^2$, although not sufficiently to allow slipping to take place. When full speed is reached the combined effect of the coils $F^2$ and H is to produce less pressure on the clutch than with the first coil $F^2$ alone although the pressure is still considerably more than is sufficient to prevent slip.

As current is taken from the dynamo the second or current coil L starts to neutralize the pressure between the clutch members and this process is continued until the clutch slips.

If the pressure tending to keep the clutch members in driving engagement were constant as it would be if only the first coil $F^2$ were employed, when slipping took place it would tend to continue until the relative speed of the clutch members D D' was such that the co-efficient of friction tended to rise with the speed and this continued slipping would cause some variation in both the current and the volts. Owing, however, to the presence of the supplementary or third coil H connected in the manner described the fall in the voltage of the dynamo which occurs as soon as slipping commences, reduces the effect of the third coil H, that is to say, increases the pressure due to the first and third coils $F^2$ and H together and for a constant current in the second coil L the pressure increases after the clutch begins to slip. This compensates for the fall in the co-efficient of friction and the clutch therefore acts more nearly as it would if the relation between the co-efficient of friction and the speed were expressed by a straight line law.

In other circumstances it may be convenient to arrange the winding or connections of the supplementary coil H so that the effect of that coil assists the action of the first coil $F^2$.

The provision of the third or supplementary coil H is not necessarily restricted to a clutch of the type shown, i. e., a differential electromagnetic clutch in which the action of one coil tending to produce driving pressure is opposed by a current coil. Nor, when the third coil is employed is it necessarily of the kind in which there is no variable air-gap between the clutch members though that is preferably the case.

Again, the shape of the clutch members and their friction surfaces may be varied as desired, the conventional form shown being merely by way of example.

What I claim as my invention and desire to secure by Letters Patent is:—

1. In an electromagnetic clutch the combination with the clutch members, of three controlling coils, one energized from some source of approximately constant voltage and tending to produce driving pressure between the clutch members and two other coils, one energized by the current from a dynamo driven through the clutch and the other by a current varying with the voltage of such dynamo.

2. The combination of a shaft driven at an approximately constant speed, a dynamo, means for separately exciting the magnetic field of said dynamo, a differential electromagnetic clutch comprising two clutch members, one driven by the constant speed shaft and the other driving the dynamo and three coils, one energized from some source of approximately constant voltage and tending to produce driving pressure between the clutch members, and two other coils, one energized by the current from the dynamo and the other by a current varying with the voltage of such dynamo.

In testimony whereof I have signed my name to this specification in the presence of the subscribing witness.

WALTER LANGDON-DAVIES.

Witness:
D. KLEYN.